United States Patent
Olesen et al.

(10) Patent No.: US 9,347,435 B2
(45) Date of Patent: May 24, 2016

(54) SYSTEM AND METHOD FOR IDENTIFYING THE LIKELIHOOD OF A TOWER STRIKE WHERE A ROTOR BLADE STRIKES THE TOWER OF A WIND TURBINE

(75) Inventors: Ib Svend Olesen, Randers (DK); Lars Glavind, Randers C (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 590 days.

(21) Appl. No.: 13/882,733

(22) PCT Filed: Oct. 31, 2011

(86) PCT No.: PCT/DK2011/050410
§ 371 (c)(1),
(2), (4) Date: Jul. 19, 2013

(87) PCT Pub. No.: WO2012/003841
PCT Pub. Date: Jan. 12, 2012

(65) Prior Publication Data
US 2013/0287567 A1    Oct. 31, 2013

Related U.S. Application Data

(60) Provisional application No. 61/409,272, filed on Nov. 2, 2010.

(30) Foreign Application Priority Data

Nov. 2, 2010 (GB) .................................. 1018502.3

(51) Int. Cl.
*F03D 11/00* (2006.01)
*F03D 7/02* (2006.01)

(52) U.S. Cl.
CPC .......... *F03D 11/0091* (2013.01); *F03D 7/0288* (2013.01); *F05B 2240/912* (2013.01);

(58) Field of Classification Search
CPC ........... F03D 11/0091; F05B 2240/912; F05B 2260/80; F05B 2270/17; F05B 2270/331; F05B 2270/808; F05B 2270/821
See application file for complete search history.

(56) References Cited

U.S. PATENT DOCUMENTS 7,638,894 B2* 12/2009 Stommel ............... F03D 7/0224
290/44
8,131,402 B2* 3/2012 Neumann ............. F03D 7/0288
290/44
(Continued)

FOREIGN PATENT DOCUMENTS

EP    1985848 A2    10/2008
EP    2202406 A2    6/2010
(Continued)

OTHER PUBLICATIONS
International Search Report; Mar. 29, 2012; PCT/DK2011/050410.
(Continued)

*Primary Examiner* — Ninh H Nguyen
(74) *Attorney, Agent, or Firm* — Patterson + Sheridan LLP

(57) ABSTRACT

A system for identifying the likelihood of a wind turbine rotor blade striking a wind turbine tower comprises a device for sensing bending of a wind turbine rotor blade and a device for sensing bending of a wind turbine tower. In a preferred embodiment Long Period Grating (LPG) sensors are used to measure bending of the tower. Preferably a plurality of LPG sensors is provided along the length of the blade. In one embodiment at least one of the LPG sensors comprises two sensing elements arranged to sense in perpendicular directions. In another embodiment a plurality of LPG sensors are provided each on different sides of the wind turbine tower. A processor uses the sensed blade and tower bending to determine whether the distance between the blade and the tower will be below a predetermined minimum value. If the distance is determined to be below the predetermined minimum value a controller may be used to adjust a wind turbine variable to reduce loading on the blade and thereby reduce the likelihood of a tower strike.

25 Claims, 2 Drawing Sheets

(52) U.S. Cl.
CPC ......... *F05B2270/17* (2013.01); *F05B 2270/31* (2013.01); *F05B 2270/33* (2013.01); *F05B 2270/804* (2013.01); *F05B 2270/808* (2013.01); *F05B 2270/821* (2013.01); *Y02E 10/721* (2013.01); *Y02E 10/722* (2013.01); *Y02E 10/723* (2013.01)

(56) References Cited

U.S. PATENT DOCUMENTS

| | | |
|---|---|---|
| 2004/0057828 A1 | 3/2004 | Bosche |
| 2006/0000269 A1 | 1/2006 | LeMieux et al. |
| 2007/0102939 A1 | 5/2007 | Stommel |
| 2010/0084864 A1 | 4/2010 | Lucks |
| 2010/0133827 A1* | 6/2010 | Huang ................. F03D 7/0224 290/44 |
| 2011/0135466 A1* | 6/2011 | Latorre .................... F03D 7/02 416/1 |
| 2011/0255974 A1* | 10/2011 | Nanukuttan ............ F03D 1/065 416/146 R |

FOREIGN PATENT DOCUMENTS

| | | |
|---|---|---|
| GB | 2440954 A | 2/2008 |
| WO | 2004056017 A1 | 7/2004 |
| WO | 2009068437 A1 | 6/2009 |
| WO | 2010046403 A2 | 4/2010 |

OTHER PUBLICATIONS

Combined Search and Examination Report (UK Patent Office); Mar. 8, 2011; GB 1018502.3.

* cited by examiner

SYSTEM AND METHOD FOR IDENTIFYING THE LIKELIHOOD OF A TOWER STRIKE WHERE A ROTOR BLADE STRIKES THE TOWER OF A WIND TURBINE

The invention relates to wind turbines and in particular to a system and method for identifying the likelihood of a tower strike.

The danger of a wind turbine rotor blade striking a wind turbine tower, often referred to as a tower strike, has long been of great concern to the wind turbine industry. As rotor blades have increased in length and become more flexible, so the risk of a tower strike has increased. Present wind turbine rotor blades may extend over 60 meters. A tower strike can cause severe damage to, or even destroy, a wind turbine rotor.

Many systems exist which attempt to identify the likelihood of a tower strike so that, if a tower strike is considered likely, evasive action may be taken to avert the threat, for example by adjusting the pitch of the blades to reduce the loading on the blades and so the amount of blade deflection or bending. In an extreme case, the wind turbine may be shut off until the threat has passed.

A common way of identifying the likelihood of a tower strike is to measure the bending or deflection of the rotor blades and use these measurements to estimate the distance or clearance between the rotor blades and the tower. If it is determined that the distance between the rotor blades and the tower will fall below a predetermined minimum value, evasive action may be taken to reduce the loading on the blades. One such method is described in US 2006/0000269. In this system, the deflection of a rotor blade is measured by providing a rod or beam one end of which is coupled to the rotor blade towards the root end. The deflection of a free end at the hub is measured by a sensor.

An alternative method is to measure the physical distance between the blades and the tower. For example, as described in US 2010/084864 a laser system may be provided on the tower, blade tip or hub which directly measures the distance between the blades and the tower. One problem with such optical solutions is that the systems are subject to failure. Wind turbines are often erected in hostile, inaccessible environments where they are exposed to rain, dirt and icing conditions which can damage the systems.

Repairing or replacing the systems may be very difficult and time consuming. If the wind turbine has to be shut off until the system is repaired, failure may be very costly.

The present invention aims to provide an improved system and method for identifying the likelihood of a tower strike.

According to the invention there is provided a wind turbine comprising at least one rotor blade and a tower, a device for sensing bending of the rotor blade, a device for sensing bending of the tower, and a processor for determining, using the sensed blade and tower bending, whether the distance between the blade and the tower will be below a predetermined minimum value.

By using sensed bending of the blade and bending of the tower to determine whether the distance between the blade and the tower will be below a predetermined minimum value, the invention enables the likelihood of a tower strike to be identified more accurately than systems which only take into account bending of the blades. Such known systems assume that the tower is relatively stiff and therefore stationary. However, the inventor has appreciated that this is not always the case. Since the present invention enables the likelihood of a tower strike to be identified more accurately, the predetermined minimum value may be chosen to incorporate a smaller safety margin than that in those known systems. Thus, advantageously, the wind turbine may be operated closer to maximum power output for more of the time.

Moreover, wind turbine towers are very large, generally metallic structures often over 100 m in length. As wind turbine towers have become taller, so they have become more flexible. It has long been a desire of the wind turbine industry to reduce the amount of metal used in the tower. Reducing the amount of metal would make the wind turbine lighter, and therefore easier to transport, as well as cheaper. However, a prohibitive factor has been that reducing the amount of metal in the tower, and thereby making the tower more flexible, would increase the risk of a tower strike. By using sensed bending of the tower as well as the blade to determine whether the distance between the blade and the tower will be below a predetermined minimum value, the invention enables the tower to be made with less metal, and therefore more flexible, without compromising safety.

Known systems which measure the physical distance between the blades and the tower inherently take into account bending of the tower as well as bending of the blades. However, in addition to the problem identified above, a problem with such systems is that they only obtain the instant distance between the blades and the tower and therefore provide little warning of a tower strike. To be effective the danger has to be identified in advance to give time for evasive action. Adjusting blade pitch, for example, may take half a second. In contrast, the system of the present invention enables the likelihood of a tower strike to be predicted sufficiently in advance to enable evasive action to be taken.

In a preferred embodiment of the invention, the devices for sensing bending of the rotor blade and the tower comprise a sensor arranged at the blade and tower for outputting a signal indicative of blade and tower bending; and an analyser configured to determine a measurement of blade and tower bending based on the signal.

Preferably the sensor for outputting a signal indicative of blade bending is arranged to measure bending in the region of the blade tip. This is particularly advantageous as due to the flexibility of the tips of wind turbine rotor blades, the tip of a blade is typically, but not always, the part of the blade which is most likely to strike the tower first. This is typically also the case even in wind turbine designs where the blades are angled away from the tower.

The sensor for outputting a signal indicative of tower bending may be mounted on or embedded in the tower. In a preferred embodiment of the invention, the sensor arranged at the tower comprises a Long Period Grating (LPG) sensor, which may comprise an optical fibre comprising an optical grating. Such sensors, unlike short period grating sensors such as Fibre Bragg Grating (FBG) sensors, may enable bend to be measured directly rather than measuring strain or deformation. Thus, the exact shape of the tower, and therefore the bend of the tower, may be measured with relatively few sensing elements. In this embodiment the device for sensing bending of the tower may further comprise a light emitting device arranged to input a light signal into the optical fibre of the Long Period Grating sensor and a light collecting device arranged to receive the light signal that has passed through the optical fibre of the Long Period Grating sensor.

In a preferred embodiment, the Long Period Grating sensor comprises an optical fibre having a plurality of optical gratings. The optical fibre may have at least two optical gratings arranged for measuring bend of the tower in perpendicular directions. Advantageously in this embodiment one LPG sensor may be arranged on one side of the tower to measure bending of the tower in more than one dimension and thus enable a 3D picture of bending of the tower to be obtained.

This is particularly advantageous in wind turbines where the nacelle may be rotated about the longitudinal axis of the tower such that the relative location of the blades and the tower changes. In an alternative embodiment, a plurality of sensors for outputting a signal indicative of tower bending may be spaced around at least a portion of the circumference of the tower. This embodiment also enables bending of the tower to be measured in more than one direction.

Preferably, when the wind turbine comprises a nacelle arranged to rotate the at least one rotor blade about the longitudinal axis of the tower, the processor uses a determination of tower bending in the direction the rotor blade will be in when it passes the tower for determining whether the distance between the rotor blade and the tower will be below a predetermined minimum value.

In a further preferred embodiment, a plurality of sensors for outputting a signal indicative of tower bending are spaced along the tower. This enables bend of the tower to be measured over a length of the tower, which is particularly advantageous for more flexible towers. In extreme wind conditions in particular, bending of the tower may not be uniform along the length of the tower.

Preferably, when the wind turbine comprises a nacelle arranged to rotate the at least one rotor blade with respect to the longitudinal axis of the tower, the processor uses knowledge of the rotation of the rotor blade when determining whether the distance between the rotor blade and the tower will be below a predetermined minimum value.

Preferably the wind turbine further comprises a controller for adjusting a variable of the wind turbine to reduce the loading on the rotor blade when the processor determines that the distance between the blade and the tower will be below a predetermined minimum value. The variable may be the pitch of the rotor blades.

The invention also resides in a wind turbine power plant, comprising a plurality of wind turbines having a tower and at least one rotor blade, wherein at least one of the wind turbines is a wind turbine as defined above, and a controller for sending a signal to adjust a variable of at least one of the plurality of wind turbines to reduce the loading on the rotor blade of the wind turbine when the processor determines that the distance between the blade and the tower will be below a predetermined minimum value.

The invention further resides in a method of operating a wind turbine as defined above, comprising sensing bending of the wind turbine rotor blade using the device defined above, sensing bending of the wind turbine tower using the device defined above, and determining, using the sensed blade and tower bending, whether the distance between the blade and the tower will be below a predetermined minimum value.

Embodiments of the invention will now be described, by way of example only, and with reference to the accompanying drawings in which.

Figure 1:
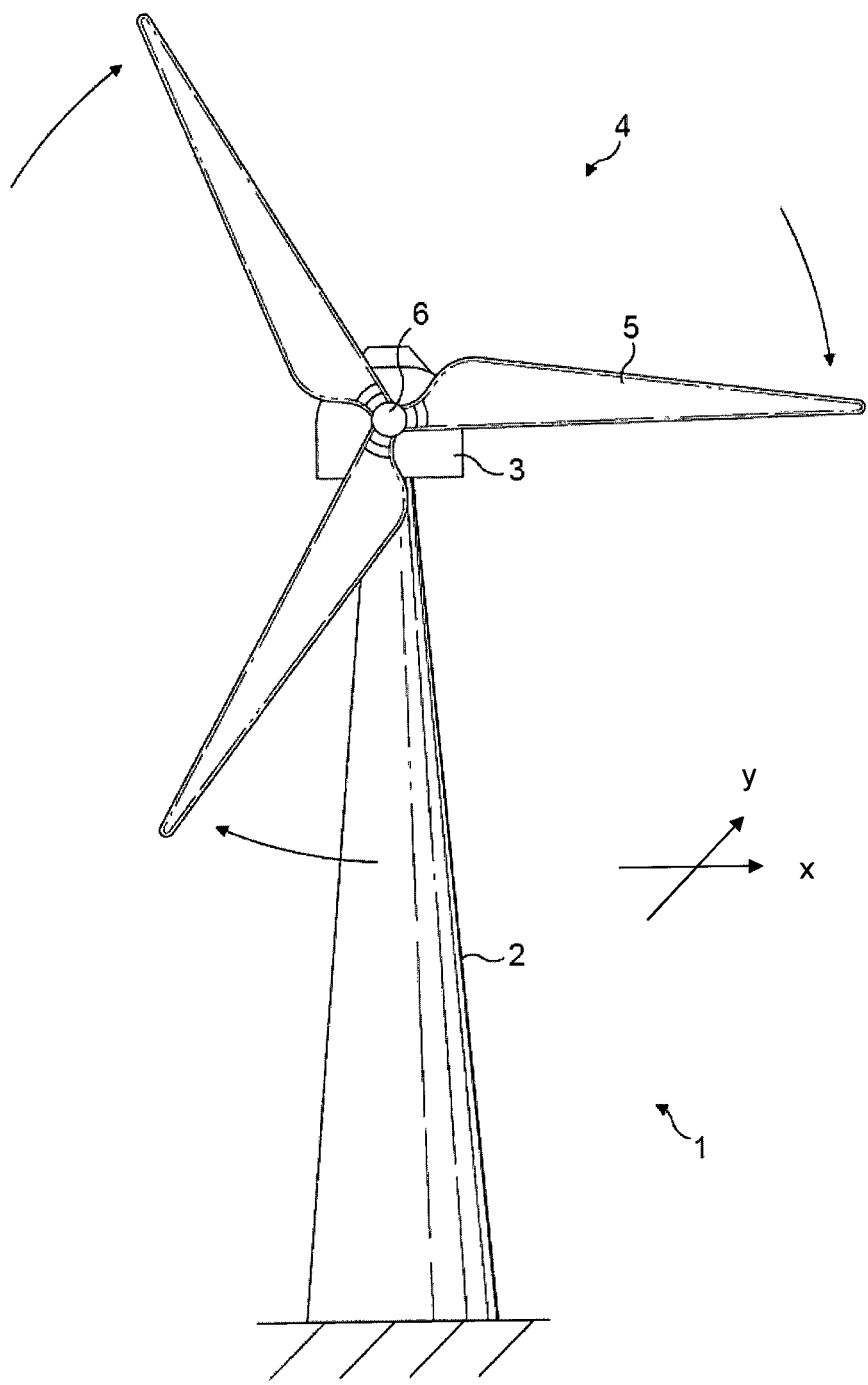
FIG. 1 is a schematic illustration of a wind turbine.

The wind turbine 1 of FIG. 1 generally comprises a nacelle 3 mounted for rotation on a tower 2. A rotor 4 comprising a plurality of rotor blades 5 and a hub 6 is mounted to the nacelle. A generator (not shown) is housed within the nacelle 3 and has a rotor shaft extending from the nacelle front which is turned by rotation of the rotor blades 5 to generate power.

Figure 2:
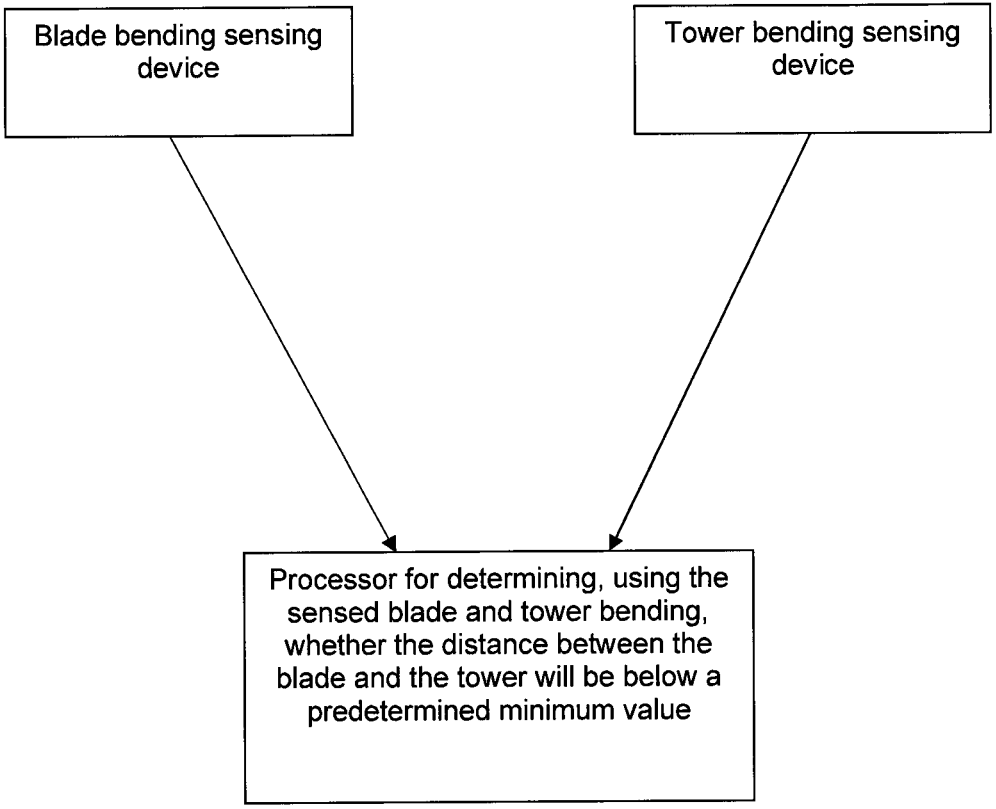
FIG. 2 is a schematic diagram of an embodiment of the invention.

FIG. 2 illustrates a schematic drawing of a system for identifying the likelihood of a wind turbine rotor blade 5 striking the tower 2 embodying the invention. The system comprises a device 7 for sensing bending of a wind turbine rotor blade 5 and a device 8 for sensing bending of the tower 2. As in this example, where the wind turbine 1 comprises a plurality of rotor blades 5, preferably a plurality of devices 7 are provided each for sensing bending of one of the rotor blades 5.

Many ways of sensing bending of wind turbine rotor blades 5 and towers 2 are known and will occur to those skilled in the art. In particular a wide variety of devices is known for sensing bending of wind turbine rotor blades 5. These include sensors for measuring strain or deflection, such as strain gauges and optical sensors, in addition to mechanical devices such as that described in US 2006/0000269 discussed above and many more. As a further example, in one known system, a camera may be mounted to a wind turbine rotor blade 5 or to another structure proximate the blade 5 to capture movement of blade 5. Many more ways of sensing bending of wind turbine rotor blades 5 and towers 2 exist.

In this embodiment the devices 7, 8 each comprise a sensor for outputting a signal indicative of blade 5 or tower 2 bending and an analyser configured to determine a measurement of blade 5 or tower 2 bending based on the signal. The sensors may be mounted on the inside or the outside of the blade 5 or tower 2, embedded or integrated into the blades 5 or tower 2 or provided within or proximate the blade 5 or tower 2. Where the sensors are embedded or integrated into the blades 5 or tower 2 typically this is done during manufacture of the component. The analyser may be provided in the proximity of the sensor or remote from the sensor. In one embodiment the analyser may be provided in the hub 6 of the wind turbine 1. The sensor and the analyser may be connected by wires, fibres or cables. Alternatively the sensor and the analyser may be connected wirelessly.

Preferably the sensor for outputting a signal indicative of blade bending is arranged to measure bending at least in the region of the blade tip. This is particularly advantageous as due to the flexibility of the tips of wind turbine rotor blades 5, the tip of a blade 5 is typically the part of the blade 5 which is most likely to strike the tower first. In an alternative preferred embodiment the sensor is arranged to measure bending at least in the region of the blade root. The blade root typically experiences the greatest bending force, and therefore measurements of bending at the region of the root of the blade may be used to provide a relatively good indication of the amount of bending along the rest of the blade 5. Measurements of bending at the region of the root of the blade may therefore be used to determine bending at the tip and other regions of the blade 5. However, more preferably the sensor is arranged to measure bending of the blade 5 along the length of the blade 5. The sensor may comprise a plurality of sensors. Presently fibre optic sensors are preferred for measuring bending of the blades as, since optical fibres are made of glass, they are not electrically conductive and therefore do not attract lightening strikes. However, as discussed above, many other types of sensor may be used.

In a preferred embodiment of the invention, Long Period Grating (LPG) sensors are used to measure bending of the tower 2. In this embodiment LPG sensors may also be used to measure bending of the rotor blades 5 or a different device for measuring bending of the blades 5 may be used.

LPG sensors are a known technology which offers different possibilities to other known fibre optic sensors, such as Fibre Bragg Grating (FBG) sensors. LPG sensors may enable bend to be measured directly, whereas other fibre optic sensors measure strain or deformation. Thus, by using LPG sensors, the exact shape of the tower 20, and therefore bending of the tower 2, may be measured with relatively few sensing elements.

Generally fibre optic sensors comprise an optical grating formed in an optical fibre. Many fibre optic sensors have a short-period grating such as FBG sensors. When the sensor is deformed the spacing of the grating changes which causes a detectable change in the wavelength of the light reflected back by the grating.

LPG sensors generally have a grating with a period which is much larger than the wavelength of the operating light source. Thus, in contrast to FBG sensors, generally LPG sensors do not produce reflected light but serve as spectrally selective absorbers. Typically the grating couples light traveling in a guided mode to a non-guided or cladding mode. The light coupled in these non-guided modes interacts with surface defects on the optical fibre and is rapidly attenuated, which results in resonance loss in the transmission spectrum, from which bend may be calculated.

In this embodiment one or more LPG sensors may be mounted on or embedded into the tower 2. The part of the optical fibre having the optical grating is attached to the region of the tower 2 where bend is to be measured. It is attached in such a way that bend experienced by the tower 2 is transmitted to the fibre and the grating.

In one configuration, a light emitting device, such as a LED, laser, halogen or metal halide sensor, is provided to input a light signal into the optical fibre of the LPG sensor from a suitable light source, and a light collecting measuring device, such as a photo sensor is provided to receive light that has passed along the fibre and through the optical grating. The light emitting device is connected to the optical fibre of the LPG sensor at one end and the light collecting measuring device connected to the optical fibre of the LPG sensor at the other end. The light emitting device and the light collecting measuring device may be provided in the hub 6 of the wind turbine and be connected to the LPG sensor by an optical fibre which runs along the tower 2. The optical fibre may be embedded in the tower 2. Alternatively the light emitting device and light collecting device may be provided at a different location but preferably they are located in the proximity of the tower 2 to minimise the length of optical fibre required.

An analyser detects resonance loss in the transmission spectrum of the collected light signal and outputs a signal from which a measurement of bending of the tower 2 can be determined. The analyser comprises a memory for storing the measurement of bending of the tower 2. The light collecting measuring device and analyser may be part of one unit or be separate units. The analyser may also comprise separate units, for example one unit for detecting resonance loss in the transmission spectrum and outputting a signal and a second for determining bending of the tower 2 from the signal. Where the units are separate, the units may be connected by cables or wires. Alternatively the units may be coupled wirelessly to one another.

In a preferred embodiment a plurality of LPG sensors are spaced along the tower 2 which means that bending of the tower 2 may be measured at different heights of the tower. In this case the part of each of the optical fibres having the optical grating is attached to a respective one of a plurality of regions spaced along the tower 2. This is desirable as, particularly in extreme wind conditions, one can not assume that bending of the tower 2 is the same all the way up the tower 2.

Preferably at least one sensor is arranged at a region of the tower 2 where the blade tip would be expected to strike the tower 2 in the event of extreme blade bending. However, more preferably, sensors are also arranged further up the tower where the blade may hit the tower in the event of extreme tower bending.

In a particularly preferred embodiment of the invention, one or more LPG sensors are arranged at the tower 2 such that a 3D picture of the tower may be obtained. This is important as wind turbine towers may have an "S" like bending shape. The top of a wind turbine tower rotor 4 generally experiences a greater load than the bottom of the rotor 4 as the force exerted by the wind is greater at the top of the rotor 4 than the bottom. This produces a bending force. If there is a gust of wind, the tower 2 may be forced back at the bottom of the tower 2 but not at the top. As, in many wind turbines, the nacelle 3 may be rotated about the longitudinal axis of the tower 2 to turn the blades 5 into or out of the wind so the relative location of the blades 5 and the tower 2 may change. Thus, in such wind turbines 1, obtaining at least a partial 3D picture of tower bending is particularly desirable as it ensures that bending of the tower in the relevant direction, the direction of the blades 5, may always be determined.

One way of measuring bending of the tower 2 in more than one direction is to arrange a single LPG sensor on one side of the tower 2 which comprises a plurality of optical gratings or sensing elements arranged for measuring bending of the tower 2 in perpendicular directions. For example one sensing element may sense bend in the x direction indicated in FIG. 1 and one in the y direction. The x and the y direction are in a substantially horizontal plane. The x direction is substantially parallel to the surface of the tower 2 to which the sensor is attached and the y direction extends through the tower. Of course, as the tower 2 bends the orientation of the sensor may change such that the x and y direction may not be perfectly horizontal. From measurements of tower bending in these two directions, bending of the tower 2 across the substantially horizontal plane may be determined. An alternative way is to arrange a plurality of LPG sensors, or other sensors, on different sides of the tower 2 for measuring bending of the tower 2 in different directions. In this case at least two tower bending sensors are spaced around at least a portion of the circumference of the tower 2. In a preferred embodiment, three or more, for example five, sensors are arranged around at least a portion of the tower. Measurements from these sensors may be processed together to determine an average of tower bending from which the direction and amplitude of overall tower bending may be derived.

Obtaining the 3D picture of the tower may reveal an undesired or unintended tilt of the nacelle 3 caused by bending of the tower 2. In other words, any unintended tilt of the nacelle 3 may be determined or calculated based on the measurements of tower bending made by the sensors arranged at the tower 2. This determination may be used when determining the distance between the tower 2 and the blade 5. Alternatively or in addition, a sensor, for example a gyro, may be provided on or in the nacelle 3 to detect any unintended tilt of the nacelle directly and thereby bending of the tower 2.

Referring back to FIG. 2, the system for identifying the likelihood of a wind turbine rotor blade 5 striking the tower 2 further comprises a processor 9 for determining, using the sensed blade and tower bending, whether the distance between the blade 5 and the tower 2 will be below a predetermined minimum value. This processor 9 may be located within a central control in the hub 6 of the wind turbine 1 or alternatively may be remote from the wind turbine 1 for example at a central wind farm control. The processor 9 may be connected to the devices 7, 8 for measuring blade and tower bending by wires or cables. Alternatively the processor 9 may be connected wirelessly to the devices 7, 8. The processor may comprise a memory for storing the measurements of tower bending.

In the embodiment described the processor 9 may determine whether the distance between the blade 5 and the tower 7 will be below a predetermined minimum value by calculating the distance which would be between the blade 5 and the tower 7 when the blade passes the tower and comparing that distance to the predetermined minimum value. This may be done directly or by using the measurements of blade and tower bending to calculate a change in the distance between the blade 5 and tower 2 and subtracting or adding that change to a previously determined distance between the blade 5 and the tower 2. Alternatively, the processor may determine whether the distance between the blade and the tower will be below a pre-determined minimum value by comparing the sensed blade and tower bending to a look up table.

Preferably, the trend of tower bending is also taken into account when determining whether the distance between the blade and the tower will fall below a predetermined minimum value. The measurements of tower bending may be stored in the processor and may be used to predict tower movement. For example in one embodiment a plurality of preceding measurements of tower bending may be used by the processor when determining whether the distance between the blade and the tower will be below a predetermined minimum value.

In many wind turbines the nacelle 3, by means of the main shaft, may be tilted to angle the blades 5 away from the tower, for example to reduce the likelihood of a tower strike, and in a preferred embodiment the processor 9 uses knowledge of the rotation of the rotor blade 5 with respect to the longitudinal axis of the tower 2, or in other words the tilt of the nacelle 3, when determining whether the distance between the rotor blade 5 and the tower 2 will be below a predetermined minimum value.

In the preferred embodiment where the nacelle 3 is arranged to rotate the at least one rotor blade 5 about the longitudinal axis of the tower 2, the processor uses the measurements of tower bending to determine tower bending in the direction of the rotor blade 5 and uses that determination to determine whether the distance between the rotor blade 5 and the tower 2 will be below a predetermined minimum value. The processor may also use the measurements of blade bending to determine blade bending in the direction of the tower 2 and use that determination to determine whether the distance between the rotor blade 5 and the tower 2 will be below a predetermined minimum value. The direction of the blades with respect to the tower may be determined based on measurements from a sensor indicating the orientation of the nacelle. Such a sensor may take a variety of forms. Most commonly, such a sensor detects the yaw position of the nacelle, by detecting the yaw movement of the nacelle relative to a predetermined yaw position, Alternatively, such a sensor may detect nacelle orientation through a GPS or other radio positioning technique.

Thus, in the embodiment described the likelihood of a wind turbine rotor blade 5 striking a tower 2 can be identified by first sensing bending of one or more of the wind turbine rotor blades 5 and sensing bending of the tower 2. Preferably, bending of the blades 5 and the tower 2 are sensed simultaneously. However, it will be appreciated that this is not essential, particularly where the trend of tower bending is taken into account. And then using the sensed blade 5 and tower 2 bending to determine whether the distance between the blade 5 and the tower 2 will be below a predetermined minimum value.

If the distance is determined to be below a predetermined minimum value, a tower strike may be considered likely and action may be taken to try and avoid a strike. A controller may be used to adjust a variable of the wind turbine 1 to reduce the loading on the rotor blades 5. In one example the controller adjusts the pitch of the rotor blades 5. Alternatively or in addition the controller may be used to vary the rotor speed, or adjust any other wind turbine variable which can change loading on the blades 5. In an extreme case the controller may turn the wind turbine off.

This control may be performed by an onboard controller or by a wind power plant controller which may control a plurality of wind turbines 1. Such a controller receives inputs from the turbines 1 it controls and outputs commands, for example instructing a change to a parameter to reduce blade loading. Thus, when one of the turbines 1 detects a likelihood of a tower strike it signals the controller which in turn sends out a command, either just to that controller or to some or all of the turbines it controls, to change a parameter such as blade pitch angle or rotor speed to reduce the loading on the blades 5 and so increase the distance between blade 5 and tower 2. The wind power plant controller may be at a central park computer. Alternatively, an onboard controller may be configured to send a signal directly to some or all of the turbines in the plant to reduce the loading on the blades 5 when it detects a likelihood of a tower strike.

Thus, by using sensing of both bending of the blades 5 and bending of the tower 2, the present invention enables the risk of a tower strike to be assessed more accurately. Thus, the minimum value below which a signal is sent to the controller, in other words the safety margin at which the wind turbine 1 is operated, can be made smaller and therefore the wind turbine 1 can be operated closer to optimum power for more of the time. The minimum value may be set taking into account movement of tower 2 bending sensed over time. Moreover, the system may be used with lighter more flexible towers without compromising safety.

Although Long Period Grating (LPG) sensors are the preferred sensor for measuring bending of the tower 2 in particular, it will be appreciated that other sensors may be used. Many sensors exist which are suitable for measuring bending of wind turbine rotor blades 5 and towers 2 and will occur to those skilled in the art. The invention is not limited to LPG sensors and is defined solely by the following claims.

The invention claimed is:

1. A wind turbine comprising:
   at least one rotor blade and a tower;
   a device for sensing bending of the rotor blade;
   a device for sensing bending of the tower; and
   a processor for determining, using the sensed blade and tower bending, whether a distance between the blade and the tower will be below a predetermined minimum value.

2. A wind turbine according to claim 1, wherein the device for sensing bending of the rotor blade comprises a sensor arranged at the blade for outputting a signal indicative of blade bending; and an analyzer configured to determine a measurement of blade bending based on the signal.

3. A wind turbine according to claim 2, wherein the sensor is arranged to measure bending of the blade at least in the region of the blade tip.

4. A wind turbine according to claim 1, wherein the device for sensing bending of the tower comprises a sensor arranged at the tower for outputting a signal indicative of tower bending; and an analyzer configured to determine a measurement of tower bending based on the signal.

5. A wind turbine according to claim 4, wherein the sensor is mounted on or embedded in the tower.

6. A wind turbine according to claim 4, wherein the sensor comprises an optical fiber having an optical grating.

7. A wind turbine according to claim 6, wherein the sensor comprises a Long Period Grating sensor.

8. A wind turbine according to claim 7, wherein the device for sensing bending of the tower further comprises a light emitting device arranged to input a light signal into the optical fiber of the Long Period Grating sensor and a light collecting device arranged to receive the light signal that has passed through the optical fiber of the Long Period Grating sensor.

9. A wind turbine according to claim 7, wherein the Long Period Grating sensor comprises an optical fiber having a plurality of optical gratings.

10. A wind turbine according to claim 9, wherein the optical fiber has two optical gratings arranged for measuring bend of the tower in perpendicular directions.

11. A wind turbine according to claim 10, wherein the wind turbine comprises a nacelle arranged to rotate the at least one rotor blade about the longitudinal axis of the tower; and the processor uses a determination of tower bending in the direction the rotor blade will be when it passes the tower for determining whether the distance between the rotor blade and the tower will be below a predetermined minimum value.

12. A wind turbine according to claim 4, comprising a plurality of sensors each for outputting a signal indicative of tower bending; the analyzer being configured to determine a measurement of tower bending based on the signals.

13. A wind turbine according to claim 12, wherein at least two of the sensors are spaced along the tower.

14. A wind turbine according to claim 12, wherein at least two of the sensors are spaced around at least a portion of the circumference of the tower.

15. A wind turbine according to claim 1, wherein the wind turbine comprises a nacelle and the processor is configured to determine tilt of the nacelle based on the sensed bending of the tower, wherein the determined tilt of the nacelle is used by the processor when determining whether the distance between the blade and the tower will be below a predetermined minimum value.

16. A wind turbine according to claim 1, wherein the wind turbine further comprises a nacelle arranged to rotate the at least one rotor blade with respect to the longitudinal axis of the tower; and the processor uses knowledge of the rotation of the rotor blade when determining whether the distance between the rotor blade and the tower will be below a predetermined minimum value.

17. A wind turbine according to claim 16 further comprising a sensor for detecting nacelle orientation, the processor using a signal indicative of nacelle orientation in said distance determination.

18. A wind turbine according to claim 1, comprising a controller for adjusting a variable of the wind turbine to reduce the loading on the rotor blade when the processor determines that the distance between the blade and the tower will be below a predetermined minimum value.

19. A wind turbine according to claim 18, wherein the variable is the pitch of the rotor blade.

20. A wind turbine power plant, comprising:
a plurality of wind turbines having a tower and at least one rotor blade, wherein at least one of the wind turbines comprises:
at least one rotor blade and a tower;
a device for sensing bending of the rotor blade;
a device for sensing bending of the tower; and
a processor for determining, using the sensed blade and tower bending,
whether a distance between the blade and the tower will be below a predetermined minimum value; and
a controller for sending a signal to adjust a variable of at least one of the plurality of wind turbines to reduce the loading on the rotor blade of the wind turbine when the processor determines that the distance between the blade and the tower will be below a predetermined minimum value.

21. A method of operating a wind turbine, comprising:
sensing bending of a rotor blade using a first device;
sensing bending of a tower using a second device; and
determining, using the sensed blade and tower bending, whether a distance between the blade and the tower will be below a predetermined minimum value.

22. A method according to claim 21, wherein the wind turbine comprises a nacelle arranged to rotate the at least one rotor blade about the longitudinal axis of the tower; and the step of determining whether the distance between the blade and the tower will be below a predetermined minimum value comprises using a determination of tower bending in the direction the rotor blade will be when it passes the tower.

23. A method according to claim 21, wherein the wind turbine further comprises a nacelle arranged to rotate the at least one rotor blade with respect to the longitudinal axis of the tower; and the step of determining whether the distance between the blade and the tower will be below a predetermined minimum value comprises using knowledge of the rotation of the rotor blade.

24. A method according to claim 21, further comprising operating a controller to adjust a variable of the wind turbine to reduce the loading on the rotor blade upon determining that the distance between the blade and the tower will be below a predetermined minimum value.

25. A method according to claim 24, wherein the variable is the pitch of the rotor blades.

* * * * *